(12) United States Patent
Da Palma et al.

(10) Patent No.: US 8,139,730 B2
(45) Date of Patent: Mar. 20, 2012

(54) INTEGRATING AN IVR APPLICATION WITHIN A STANDARDS BASED APPLICATION SERVER

(75) Inventors: William V. Da Palma, Coconut Creek, FL (US); Brett J. Gavagni, Sunrise, FL (US); Baiju D. Mandalia, Boca Raton, FL (US); Brien H. Muschette, Palm Beach Gardens, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1661 days.

(21) Appl. No.: 11/247,508

(22) Filed: Oct. 11, 2005

(65) Prior Publication Data
US 2007/0081520 A1    Apr. 12, 2007

(51) Int. Cl.
*H04M 11/00* (2006.01)
(52) U.S. Cl. ............... 379/88.18; 379/88.17; 379/88.22; 379/220.01; 379/265.09; 704/270.1

(58) Field of Classification Search ............... 379/88.18, 379/88.17, 88.22, 220.01, 265.09; 704/270.1
See application file for complete search history.

(56) References Cited

U.S. PATENT DOCUMENTS

| | | | |
|---|---|---|---|
| 2004/0039728 A1* | 2/2004 | Fenlon et al. | 707/1 |
| 2005/0015489 A1 | 1/2005 | Whynot et al. | |
| 2005/0069102 A1* | 3/2005 | Chang | 379/88.18 |
| 2005/0177371 A1* | 8/2005 | Yacoub et al. | 704/270.1 |

* cited by examiner

*Primary Examiner* — Ahmad Matar
*Assistant Examiner* — Khai N Nguyen
(74) *Attorney, Agent, or Firm* — Patents on Demand P.A.; Brian K. Buchheit; Scott M. Garrett

(57) ABSTRACT

A method for providing Interactive Voice Response functionality within a multi-tiered telephony environment can identify an enterprise archive file that contains an Interactive Voice Response (IVR) application. The enterprise archive file can contain multiple interpreters for different markup languages. The enterprise archive file can also include a servlet that maps the interpreters to telephony sessions. The enterprise archive file can be deployed within a J2EE compliant application server having a SIP interface. The deployed IVR application can be utilized to provide IVR functions for SIP based telephony sessions.

20 Claims, 3 Drawing Sheets

INTEGRATING AN IVR APPLICATION WITHIN A STANDARDS BASED APPLICATION SERVER

BACKGROUND

1. Field of the Invention

The present invention relates to the field of speech processing and, more particularly, to a novel way to implement and deploy interactive voice response (IVR) functionality within a telephony environment.

2. Description of the Related Art

Interactive Voice Response (IVR) systems are systems that permit callers to interact with one or more computer systems using voice input and/or a telephone keypad. IVR systems translate the caller provided input into a form comprehensible by computer systems resulting in programmatic responses being generated. IVR systems can interpret output resulting from the programmatic responses and provide appropriate feedback to the callers. The feedback is generally audibly presented to callers as automatically generated speech output.

In a conventional telephony architecture, an IVR application is generally implemented within an IVR server, which is communicatively linked to the telephony network. In one common arrangement, the IVR server can be connected to a caller via a switched voice network and can be connected to one or more computer systems through a data network. The IVR system can receive caller input via the switched voice network, translate the input, and convey the translated input to the computer system via the data network.

In an Advanced Intelligent Network (AIN) environment, telephony services can be hosted in computer nodes or network elements of a data network. When deployed within an AIN environment, the IVR system can be implemented as a particular network element that provides IVR functionality. Under a conventional approach, logic for interacting with IVR network elements can be included within different application server specific components. Deployment of IVR components within an application server and parameter adjustment and/or optimizations for the same can be application server specific modifications requiring the attention of a skilled technician.

Conventionally implemented IVR systems are generally proprietary systems, which can be highly expensive to implement and maintain. These propriety IVR systems typically utilize a proprietary interface, unique to that particular IVR system. Accordingly, integrating a computer system to a conventionally implemented IVR system can require a substantial amount of time. Additionally, an administrator maintaining the IVR system must learn proprietary scripting languages, IVR specific interfaces, and other IVR specific features. Thus, the administrator must often attend IVR specific training and expend time becoming proficient with a particular IVR system. Should the owner of the computer system choose to utilize a different IVR system, the administrator must attend new training, new interface adjustments must be made, and additional time must be spent to for the administrator to become proficient with the new IVR system.

Further, when updating conventionally implemented IVR systems to incorporate new technologies, the underlying architecture of the IVR system may have to be fundamentally altered. Architecture changes can be costly and time intensive to implement.

SUMMARY OF THE INVENTION

A system and method for integrating an Interactive Voice Response (IVR) application component within a telephony application server at the application level in accordance with an embodiment of the inventive arrangements disclosed herein. The application server within which the IVR application is implemented can utilize modular components of a standardized runtime platform. The runtime platform can provide functionality for developing distributed, multi-tier, Web-based applications. The runtime platform can include a standard set of services, application programming interfaces, and protocols.

In one embodiment, the runtime platform can be a JAVA 2 ENTERPRISE EDITION (J2EE) based platform. The IVR application can be packaged as a JAVA enterprise archive file (EAR) and deployed upon any J2EE based application server using standardized EAR deployment mechanisms. The application server can be any of a variety of J2EE compliant application servers including, but not limited to, a WEBSPHERE application server from International Business Machines Corporation of Armonk, N.Y., a BEA WEBLOGIC application server from BEA Systems, Inc. of San Jose, Calif. and/or a JBOSS application server from JBoss, Inc. of Atlanta, Ga.

It should be appreciated that the above solution provides a means for integrating IVR functionality into an existing telecommunication infrastructure in a platform independent and extensible fashion. The solution adheres to established information technology standards and not to proprietary interfaces, allowing the solution to be implemented and maintained without retraining administrative personnel. The use of open standards in implementing IVR functionality can permit the same IVR functionality to be designed once and executed upon multiple platforms. Further, the use of open standards and leveraging an existing telecommunication infrastructure greatly reduces implementation and maintenance cost and makes it easy to update IVR functionally.

For example, the above solution contemplates that new markup interpreters can be designed and easily added to the IVR application by plugging a new or modified interpreter into the application server. The new or modified interpreter can be deployed using an appropriately modified EAR file via a web-based administration console.

The present invention can be implemented in accordance with numerous aspects consistent with material presented herein. For example, one aspect of the present invention can include an application server including an IVR application and a Session Initiation Protocol (SIP) interface. The IVR application can include a SIP servlet and a plurality of markup interpreters. Each markup interpreter can be based upon a common interpreter interface. The servlet can call methods of the interpreters in accordance with the common interpreter interface. The SIP interface can handle SIP operations for the application server. For SIP based telephony sessions involving IVR operations, the SIP interface can convey a SIP incoming request for a SIP telephony session to the SIP servlet. Upon receiving the SIP incoming request, the SIP servlet can determine at least one of the markup interpreters for interpreting markup during an associated SIP based telephony session.

Another aspect of the present invention can include an EAR file configured for deployment in a J2EE compliant application server. The EAR file can include one or more markup interpreters, each markup interpreter being based upon a common interpreter interface. The EAR file can also include a servlet configured to map incoming requests formatted in accordance with a SIP based protocol to one of the markup interpreters based upon a type of markup that is to be used during a telephony session as specified by the incoming request. The application server can utilize the mapped markup interpreter for the telephony session to handle markup associated with an IVR application executing upon the application server.

Still another aspect of the present invention can include a method for providing IVR functionality within a multi-tiered telephony environment. The method can identify an EAR file that contains an IVR application. The EAR file can be deployed within a J2EE compliant application server having a SIP interface. The deployed IVR application can be utilized to provide IVR functions for SIP based telephony sessions.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request. For example, as part of deploying or maintaining IVR functionality for a customer, a service agent can use an EAR file to deploy the IVR application within an application server accessible by the customer in accordance with customer specific needs.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
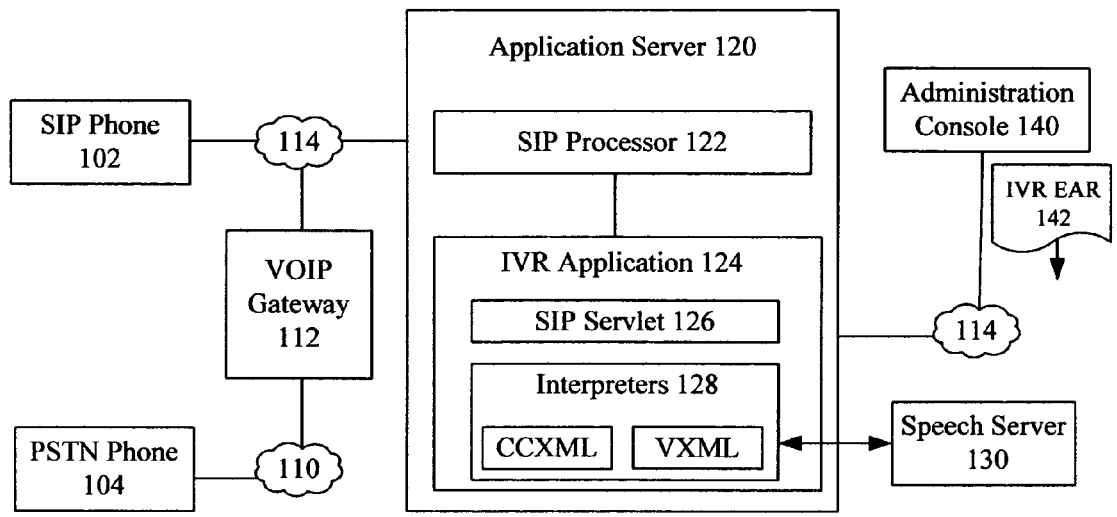
FIG. 1 is a schematic diagram of a telephony environment for providing IVR functionality in accordance with an embodiment of inventive arrangements disclosed herein.

FIG. 1 is a schematic diagram of a telephony environment 100 for providing IVR functionality in accordance with an embodiment of inventive arrangements disclosed herein. Environment 100 can include an application server 120 that is communicatively linked to Session Initiated Protocol (SIP) phone 102 and/or PSTN phone 104.

SIP phone 102 can be any communication device through with a caller can use a SIP based protocol to establish communications with application server 120. SIP phone 102 can be a line based or a wireless communication device. For example, SIP phone 102 can include an internet protocol (IP) or Voice over Internet Protocol (VoIP) phone. SIP phone 102 can also include a desktop computer or other computing device having SIP communication software and suitable peripheral devices attached, such as a microphone and a speaker. A caller can utilize SIP phone 102 to directly establish a SIP communication session with application server 120 over data network 114.

Public Switched Telephone Network (PSTN) phone 104 can be any communication device linking a telephone user to a PSTN network 110. PSTN phone 104 can include mobile telephones, line-based phones, cordless phones, computers and fax machines having modems, and other such computing devices. PSTN network 110 can be communicatively linked to a VoIP gateway 112.

VoIP gateway 112 can be a network node equipped for interfacing among two or more networks that use different protocols, such as PSTN network 110 and data network 114. More specifically, the VoIP gateway 112 can convert circuit based signals originating from PSTN phone 104 to packet based signals conveyed to application server 120 and can convert packet based signals from application server 120 to circuit based signals conveyed to PSTN phone 104. The protocol conversions can occur in real time. In one embodiment, the VoIP gateway 112 can be an IVR gateway configured to interface with IVR application 124.

Application server 120 can be an application server that utilizes modular components of a standardized runtime platform. The application server 120 can represent a middleware server of a multi-tier environment. The runtime platform can provide functionality for developing distributed, multi-tier, Web-based applications. The runtime platform can also include a standard set of services, application programming interfaces, and protocols. That is, the runtime platform can permit a developer to create an enterprise application that is extensible and portable between multiple platforms. The runtime platform can include a collection of related technology specifications that describe required application program interfaces (APIs) and policies for compliance.

The modular nature of the runtime platforms upon which the application server 120 is based can provide comprehensive fault tolerance and security that does not require the addition of specialized hardware, such as new telephony cards that would generally be required when implementing fault tolerance measures. Consequently, by implementing the IVR application 124 within a standardized application server infrastructure, the infrastructure can be leveraged to provide a cost efficient, yet robust, IVR implementation.

In one embodiment, the runtime platform can be a JAVA 2 PLATFORM ENTERPRISE EDITION (J2EE) software platform. Accordingly, the application server 120 can be a J2EE compliant application server, such as a WEBSPHERE application server from International Business Machines Corporation of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. The runtime platform is not to be construed as limited in this regard and other software platforms, such as the NET software platform, are contemplated herein. Accordingly, the application server 120 can be a .NET or other software platform compliant application server.

Application server 120 can include a SIP processor 122 that handles SIP related operations. SIP processor 122 can, for example, receive packet based telephony data over data network 114 and convert these packets in to a SIP compliant format. As used herein, the SIP protocol is utilized to generically represent any VoIP based protocol. SIP is a prevalent protocol being used in VoIP telephony networks today and referring to elements and specific examples based upon the SIP protocol has been done for purposes of clarity of description and is not intended to represent a limitation of the inventive concepts contained herein. It is contemplated and within the skills of an ordinary telecommunication engineer to adapt SIP protocol specific elements and examples to any other VoIP protocol including, but not limited to the H.323 protocol by the International Telecommunications Union (ITU), the media gateway control protocol (MGCP), the SIGTRAN protocol by the Internet Engineering Task Force (IETF), and/or the skinny protocol by Cisco Systems, Inc of San Jose, Calif. For example, in environment 100, SIP processor 122 and SIP servlet 126 can be alternatively implemented as an H.323 processor (not shown) and a H.323 servlet (not shown).

The IVR application 124 can be an application that permits callers using SIP phone 102 and/or PSTN phone 104 to interact and receive information from a database using touch-tone signals and voice input. The IVR application 124 can provide information to the user in the form of automatically generated speech output. The IVR application 124 can present a series of voice prompts to a user and can receive and process prompt responses in accordance with previously established dialogue menus. Speech processing operations, such as text-to-speech operations, speech-to-text operations, caller identification operations, and voice authorization operations can be provided by a remotely located speech server 130.

The IVR application 124 can interface with one or more remotely located computer systems, such as a management information system (MIS) or database system of a business associated with the IVR system. For example, an IVR application 124 that is customized to provide customers with banking information can be communicatively linked to a bank's customer account database. In one embodiment, the IVR application 124 can include voice browsing capabilities to permit callers to access Web content via phone 102 and/or phone 104.

The Interactive voice response application 124 can include a SIP servlet 126 and one or more interpreters 128. Interpreters 128 can include Call Control Extensible Markup Language (CCXML) interpreters, Voice Extensible Markup Language (VoiceXML) interpreters, Extensible Hypertext Markup Language (XML) plus voice profiles (X+V) interpreters, Speech Application Language Tags (SALT) interpreters, Media Resource Control Protocol (MCRP) interpreters, customized markup interpreters, and the like. Additionally, different versions of the interpreters, which may conform to different versions of a markup language, can exist. For example, a first interpreter 128 can be used to interpret VXML version 2.1 markup and a different interpreter 128 can be used to interpret VXML version 3.0 markup.

The SIP servlet 126 can map incoming SIP requests to the appropriate interpreters based upon a type of markup that is to be used during a telephony session as specified by the incoming request. The mapping and specification of the appropriate interpreter can occur by any of a variety of means. For example, the target interpreter 128 can be inferred from the Uniform Resource Identifier (URI) on an SIP INVITE command (e.g. "INVITE sip:IVR@0.22.74.34:5070?http://srv/app.c SIP/2.0"). In another example, an appropriate interpreter 128 can be specified in an extension of a markup (e.g. "application/voice+xml" for Voice XML). In still another example, i-lines in the Session Description Protocol (SDP) block can identify an appropriate interpreter 128 (e.g. i=ivr-interpreter ccxml").

In one embodiment, the various interpreters 128 can be based upon a common interpreter interface. The SIP servlet 126 can call methods for the interpreters 128 based upon the common interpreter interface. Called methods called can include any of a variety of methods, such as methods to set a document to process, methods to set interpreter properties for a SIP session, methods to initialize primary interpreter processes, methods to set a listener, methods to receive and handle events, and the like.

In another embodiment, each interpreter 128 can be implemented as an object class. Each specific instance class can inherent methods and parameters from a base class, such as a generic interpreter class. Any number of interpreters can be implemented to handle any number of markup types and versions. In one illustrative embodiment, five different types of markup can each be associated with a particular interpreter 128, as shown by the following illustrative configuration.

| Markup | Class Name |
| --- | --- |
| ccxml | com.ivr.ccxml.CCxml10Interpreter.class |
| vxml | com.ivr.vxml.Vxml21Interpreter.class |
| vxml3 | com.ivr.vxml.Vxml30Interpeter.class |
| other | com.ivr.other.OtherInterpreter.class |
| homegrown | com.ivr.other.HomeGrown.class |

Because the IVR application 124 can conform to standards established for a particular runtime platform a common deployment mechanism can be used to facilitate deployment of the IVR application 124 within any of a variety of application servers 120 implemented in accordance with the runtime platform. For example, the IVR application 124 can be packaged within an enterprise archive file 142, such as a JAVA EAR file. The enterprise archive file 142 can include SIP servlet 126 and interpreters 128

Accordingly, an authorized administrator can use deploy the enterprise archive 142 in a variety of manners. For example, the administrator can use a Web based administration console 140 linked to the application server 120 via network 114 to deploy the enterprise archive file 142. By bundling the various interpreters in the enterprise archive file 142, additional interpreters can be easily added at need. For example, additional support files for the new interpreters can be added to the enterprise archive file 142, which can be re-deployed in the application server 120. Other updates to the IVR application 124, such as adding new IVR features, can be implemented in a similar fashion.

Figure 2:
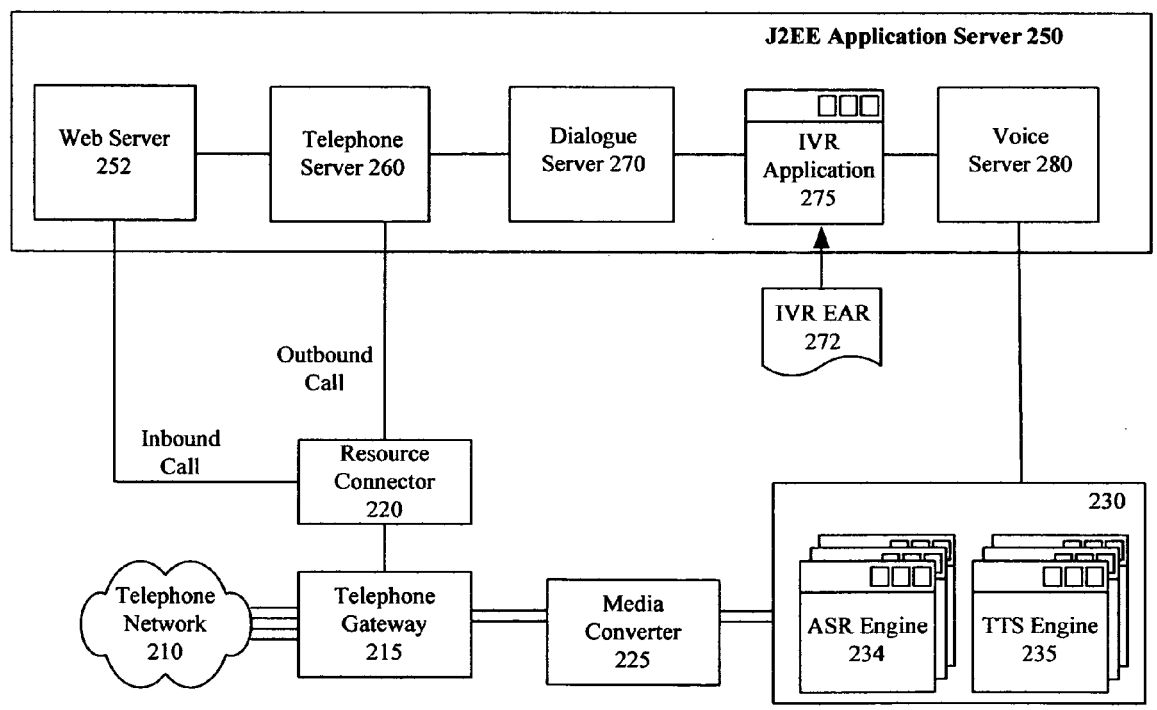
FIG. 2 is a schematic diagram of a system that integrates an IVR application deployed via an IVR EAR file within a J2EE compliant application server in accordance with an embodiment of the illustrative arrangements disclosed herein.

FIG. 2 is a schematic diagram of a system 200 that integrates an IVR application deployed via an IVR EAR file within a J2EE compliant application server in accordance with an embodiment of the illustrative arrangements disclosed herein. System 200 represents one contemplated embodiment for implementing arrangements detailed for telephony environment 100. It should be understood that other embodiments and environments for implementing the IVR application within an application server exist and that the invention is not to be construed as limited in this regard.

In FIG. 2, system 200 illustrates a turn-based operational environment in which voice processing tasks occur, where the voice processing tasks include IVR tasks. More specifically, system 200 shows an architecture for an integrated IVR system capable of interfacing with users connected via a telephone network 210. For example, the IVR application 275 included within J2EE application server 250 can be an IVR application for an automated call center that interfaces with users via voice-based telephone sessions. Components of IVR application 275 can be packaged in IVR enterprise archive file 272, which can be deployed within the J2EE application server 250.

The system 200 can include a telephone gateway 215, one or more speech engines 230, a resource connector 220, and/or a media converter 225 in addition to J2EE application server 250. The telephone gateway 215 can include hardware and/or software that translates protocols and/or routes calls between a telephone network 210, such as a Public Switched Telephone Network (PSTN) and the J2EE application server 250. The resource connector 220 can connect inbound and outbound calls to the J2EE application server 250.

The speech engines 230 can include one or more automatic speech recognition engines 234, one or more text-to-speech engines 235, and other media resources. Particular ones of the speech engines 230 can include one or more application program interfaces (APIs) for interfacing with the J2EE application server 250.

The media converter 225 can route input/output streams in one format to appropriate speech engines 230 as assigned by the J2EE application server 250. Accordingly, the media converter 225 can assure that output generated by the J2EE application server 250 is converted into an outgoing audio stream with speech generated content and that speech input from an incoming audio stream is converted by an assigned speech engine 230 before being conveyed to the J2EE application server 250.

The J2EE application server 250 can also include a multitude of component servers, such as telephone server 260, dialogue server 270, and voice server 280, communicatively linked via one or more Web servers 252. Each Web server 252 can include one or more plug-ins, where each plug-in can include routines for conveying data to particular component servers within the J2EE application server 250. Each of the component servers of the application server 250 can be components implemented within a Viral Machine, such as virtual machines adhering to the J2EE specification or other similar and/or derivative specification.

In one embodiment, the IVR application 275 can be a stand alone component deployed within the J2EE application server 250 that handles IVR functions for a SIP telecommunication session. The IVR application 275 can receive markup from the dialogue server 270 and process the markup using an appropriate markup interpreter. When voice services are required, IVR application 275 can convey voice processing requests to the voice server 280, which handles the requests using one or more speech engines 230. In another embodiment, the IVR application 275 can be an application disposed within the dialogue server 270 or any other server or component of the J2EE application server 250. Deployment parameters for the IVR application 272 can be specified within the IVR enterprise archive file 272.

It should be appreciated that the J2EE application server 250 can include a SIP interface capable of treating any telephony session as a SIP based session. Accordingly, the IVR application 275 can provide IVR functionality for any type of telephony session, whether the session is initiated from a PSTN phone, a SIP enabled phone, or other telephony device conforming to any protocol capable of being handled by the J2EE application server 250.

Figure 3:
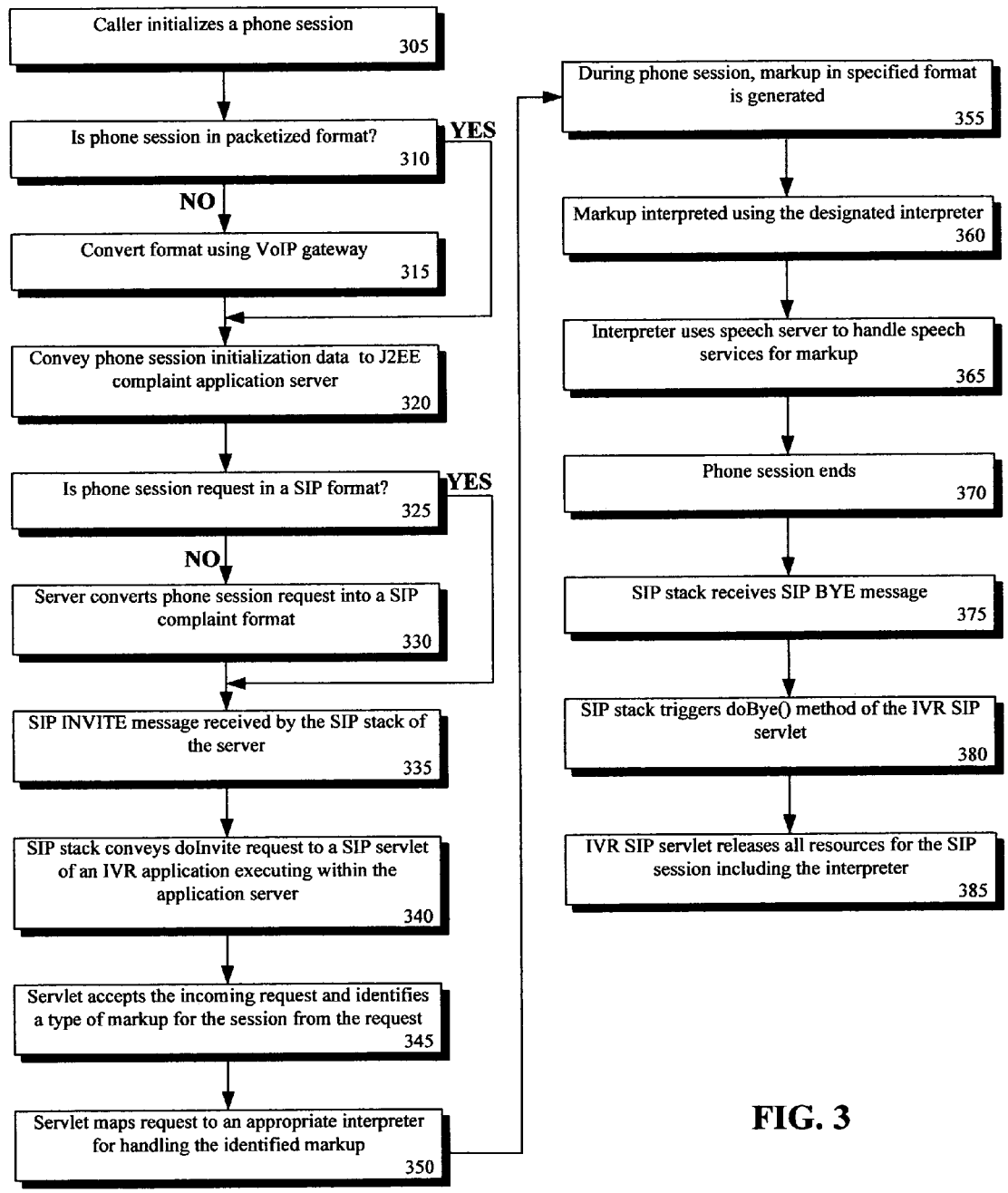
FIG. 3 is a flow chart of a method for providing IVR functionality for SIP telephony sessions by deploying an IVR application in a J2EE compliant server in accordance with an embodiment of the inventive arrangements disclosed herein.

FIG. 3 is a flow chart of a method 300 for providing IVR functionality for SIP telephony sessions by deploying an IVR application in a J2EE compliant server in accordance with an embodiment of the inventive arrangements disclosed herein. Method 300 can be performed in the context of environment 100 and/or system 200. Method 300 is not limited in this regard and can be performed in the context of any telephony environment having a deployed IVR application within an application server. In one embodiment, the deployment of the IVR application can include the steps of packaging the application and associated components within an enterprise archive file, such as a JAVA EAR file, and deploying the enterprise archive file within the application server.

Method 300 can begin in step 305, where a caller initializes a phone session. In step 310, the method can determine if the phone session is a VoIP session that uses packets to convey telephony signals. A VoIP session can be initialized from an IP phone or from a computer having VoIP software. A circuit based voice session can be initialized from a standard PSTN network or mobile phone. If the initialized phone session is initialized from a PSTN phone, the method can proceed to step 315, where the format of the telephone signals can be converted into a packetized format using a VoIP gateway. If the phone session is already in a packetized format, the method can proceed from step 310 to step 320 directly.

In step 320, phone session initialization data can be conveyed to a J2EE compliant server, such as a WEBSPHERE application server. In step 325, a determination can be made as to whether the VoIP phone session request is in SIP format or conforms to a different VoIP format. In step 330, if a format other than SIP is used, the phone session request can be converted into a SIP compliant format. In step 335, responsive to the phone session initialization data, a SIP INVITE message can be received by a SIP stack located within the J2EE server.

In step 340, the SIP stack can convey a doInvite( ) request to a SIP servlet. The SIP servlet can be contained within an IVR application executing within the J2EE server. In step 345, the servlet accepts the incoming request and identifies a type of markup and/or markup interpreter that is to be used for the session. For example, the incoming request can specify that a VoiceXML interpreter is to be utilized. In step 350, the servlet can map the request to an appropriate interpreter.

In step 355, during the phone session, markup associated with an IVR function in the specified format can be generated by J2EE server components. In step 360, the markup can be interpreted using the designated interpreter of the IVR application. In step 365, the interpreter can use a speech server to handle speech services. In one embodiment, a Media Resource Control Protocol (MRCP) compliant speech server can be used.

In step 370, the phone session can be terminated. For example, the caller can hang up or the IVR application can disconnect from the caller. In step 375, the SIP stack can receive a SIP BYE message. In step 380, the SIP stack can call a doBye( ) method within the IVR SIP servlet. In step 385, the IVR SIP servlet can release all resources for the SIP session including the interpreter.

Figure 4:
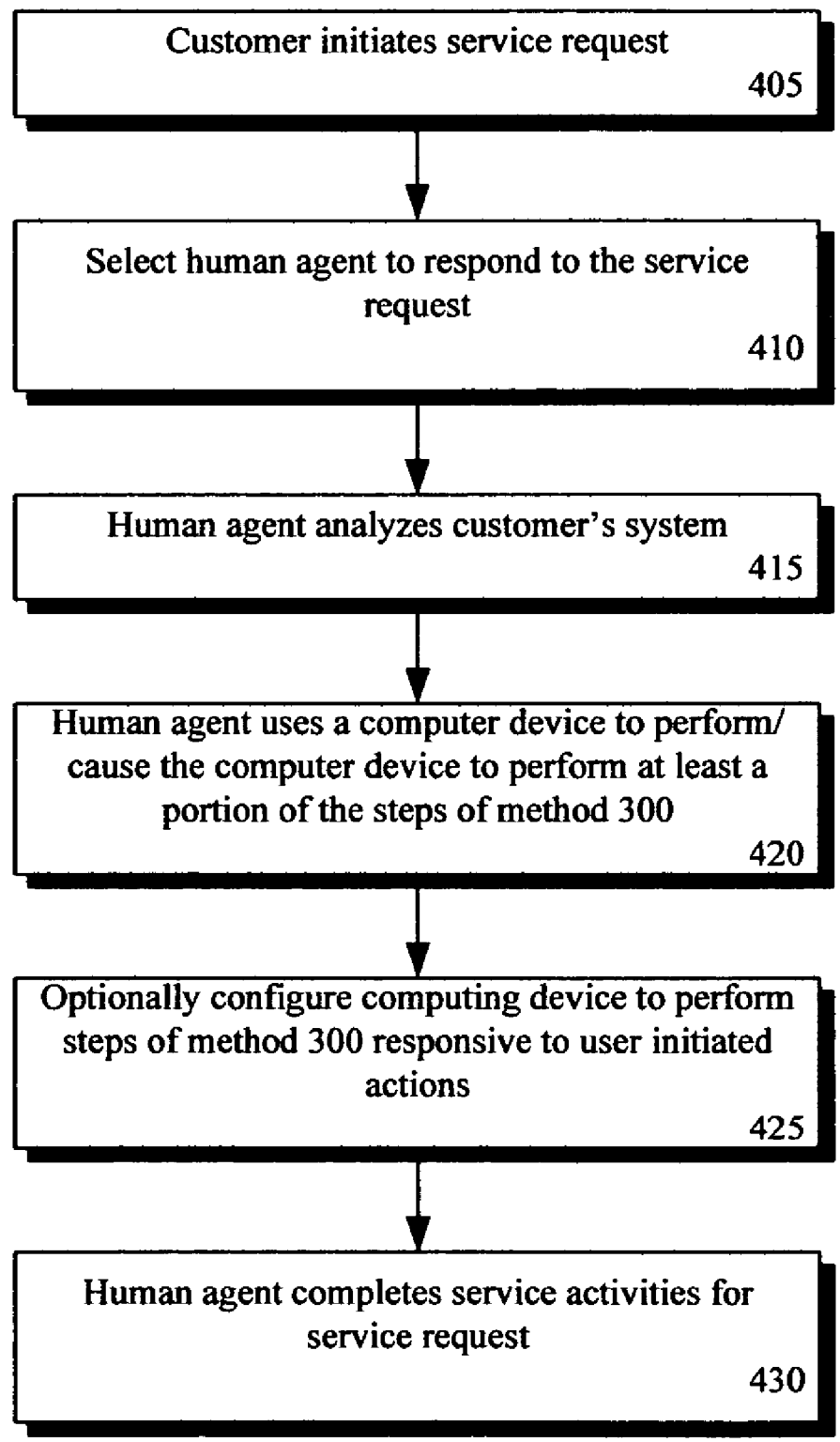
FIG. 4 is a flow chart of a method showing a manner in which a service agent can configure an IVR application disposed within an application server in response to a service request in accordance with an embodiment of the illustrative arrangements disclosed herein.

FIG. 4 is a flow chart of a method 400 showing a manner in which a service agent can configure an IVR application disposed within an application server in response to a service request in accordance with an embodiment of the illustrative arrangements disclosed herein. For example, the service agent can configure environment 100 and/or system 200 so that the system is capable of performing method 300.

Method 400 can begin in step 405, when a customer initiates a service request. The service request can be a request for a new IVR system as well as a request to service an existing IVR system with which the customer is experiencing problems or for which the customer wishes an upgrade. In step 410, a human agent can be selected to respond to the service request. In step 415, the human agent can analyze a customer's IVR needs. In step 420, the human agent can use one or more computing devices to perform or to cause the computer device to perform the steps of method 300.

Appreciably, the one or more computing devices used by the human agent can include the customer's computer, a mobile computing device used by the human agent, a networked computing device, and combinations thereof. The human agent may make adjustments to a middleware application server and/or to a client operated management information system that utilizes the middleware application server. For example, the human agent can load and configure an IVR application within a middleware application server and can adjust interface parameters of a customer's computer system to interact with the application server.

In optional step 425, the human agent can configure the customer's computer in a manner that the customer or clients of the customer can perform one or more steps of method 300 in the future. For example, a client can be a banking institute that utilizes the agency which employs the human agent to deploy, maintain, and otherwise manage a bank IVR system. After the human agent configures the application server and/or the client's computer system, bank customers can call a telephone number associated with the IVR application, respond to IVR prompts, and receive audible information concerning their bank accounts. In step 430, the human agent can complete the service activities having resolved the problem for which the service request was submitted.

It should be noted that while the human agent may physically travel to a location local to adjust the customer's computer or application server, physical travel may be unnecessary. For example, the human agent can use a remote agent to remotely manipulate the customer's computer system and/or an application server.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An application server comprising:
   hardware of a computing system comprising a tangible storage medium that is a computer-readable medium that stores computer program products having instructions executable by the hardware of the computing system, wherein said computer program products comprise a telephone server, a dialog server, a Voice server, an IVR application, and a program implementing a SIP interface, wherein the IVR application is a component deployed within the application server that handles interactive voice response functions for a SIP communication session, wherein the telephone server, the dialog server, and the voice server are each modular components of the application server;
   the Interactive Voice Responses (IVR) application comprising a Session Initiation Protocol (SIP) servlet and a plurality of markup interpreters, each markup interpreter being based upon a common interpreter interface of the application server, wherein the common interpreter interface is used by the telephone server, the dialog server, the voice server, and the IVR application to exchange information with each other internal to the application server, wherein said servlet calls methods of the plurality of markup interpreters in accordance with the common interpreter interface
   wherein for SIP based telephony sessions involving interactive voice response operations, said SIP interface is configured to convey a SIP incoming request for a SIP telephony session to said SIP servlet, wherein upon receiving said SIP incoming request, said SIP servlet determines at least one of said plurality of markup interpreters for interpreting markup during a SIP based telephony session associated with the incoming session request, and wherein during the SIP telephone session involving interactive voice response operations, functionality of the telephone server, the dialog server, the voice server, and the IVR application are cooperatively utilized using the common interpreter interface to exchange information between these modules of the application server, said information exchanges being internal to the application server and in conformance with standards of the application server.

2. The application server of claim 1, wherein said application server comprises hardware and utilizes modular components of a standardized runtime platform, wherein said platform provides functionality for developing distributed, multi-tier, Web-based applications, and wherein said platform includes a standard set of services, application programming interfaces, and protocols, wherein one of the standard set of protocols is the common interpreter interface, wherein the computer program products of the application server comprises a Web server, wherein the application server without the IVR application and the program represent a functional telecommunication infrastructure for providing telecommunication and Web services that lacks IVR functionality, wherein inclusion of the IVR application and the program integrates IVR functionality into the functional telecommunication infrastructure.

3. The application server of claim 1, wherein said voice server of the application server performs voice processing tasks for the application server by interacting with one or more speech engines, which comprise at least one of an automatic speech recognition engine and a text to speech engine, wherein the IVR application lacks an internal ability to internally perform voice processing tasks in absence of the voice server.

4. A computer-readable medium that is encoded with instructions that are able to be executed by a computing system, said computer-readable medium comprising:
   an enterprise archive file stored on the computer-readable medium, said enterprise archive file being configured for deployment in a JAVA 2 PLATFORM ENTERPRISE EDITION (J2EE) compliant application server implemented as a program stored in a tangible storage medium, said program controlling computing equipment, said enterprise archive file comprising:
   a plurality of markup interpreters, each markup interpreter being based upon a common interpreter interface; and a servlet configured to map incoming requests formatted in accordance with a Session Initiation Protocol (SIP) to one of said markup interpreters based upon a type of markup that is to be used during a telephony session as specified by the incoming request, wherein the application server utilizes the mapped markup interpreter for the telephony session to handle markup associated with an Interactive Voice Response (IVR) application executing upon the application server, wherein in absence of the IVR application deployed via the enterprise archive file, the application server represents a functional telecommunication infrastructure for providing telecommunication and Web services that lacks IVR functionality, which is provided by the IVR application when deployed within the application server, wherein the application server comprises a Web server, a telephony server, a dialog server, and a voice server all of which are operable for providing the telecommunication and Web services before deployment of the IVR application.

5. The computer-readable medium of claim 4, wherein said servlet accepts the incoming request from a SIP stack of the application server, wherein during a telephony session the Web server, the telephony server, the dialog server, the voice server, and the IVR application exchange information internally in accordance with standards and protocols of the application server.

6. The computer-readable medium of claim 4, wherein said IVR application utilizes a media resource control protocol (MRCP) compliant speech server external to the application server to provide text-to-speech and speech-to-text operations, wherein the voice server component is the only component of the application server that directly interacts with the speech server.

7. The computer-readable medium of claim 4, wherein the plurality of markup interpreters include a Voice Extensible Markup Language (VXML) based interpreter and a Call Control eXtensible Markup Language (CCXML) based interpreter, wherein providing IVR functionality does not transfer a call from the application server but instead causes IVR functionality of the IVR application to be utilized during the telephony session.

8. The computer-readable medium of claim 4, wherein said application server is selected from at least one of a group consisting of a WEBSPHERE application server, a BEA WEBLOGIC application server, and a JBOSS application server.

9. A method for providing Interactive Voice Response functionality within a multi-tiered telephony environment comprising the steps of:
identifying an enterprise archive file stored on a tangible storage medium that contains an Interactive Voice Response (IVR) application;
identifying hardware of a computing system comprising a tangible storage medium that is a computer-readable medium that stores computer program products having instructions executable by the hardware of the computing system, wherein said computer program products comprise a telephone server, a dialog server, a Voice server, and a Web server, wherein the telephone server, the dialog server, the voice server, and the Web server are each modular components of an application server, wherein the application server represent a functional telecommunication infrastructure for providing telecommunication and Web services, wherein the application server lacks IVR functionality;
deploying the enterprise archive file within the application server, thus adding the application server responsive to the deploying to existing components of the application server;
utilizing the deployed IVR application of the application server to provide IVR functionality to the application server, which results in the application server providing telecommunication, Web services, and IVR functionality by internally conveying information among modular components in accordance with application server protocols, said modular components comprising the telephone server, the dialog server, the Web server, and the IVR application.

10. The method of claim 9, wherein the voice server component is the only component of the application server that directly interacts with a speech server, wherein the IVR application conveys voice processing requests to the voice server, which handles the voice processing requests using one or more speech servers external to the application server, wherein said speech servers provide text-to-speech and speech-to-text operations for SIP based telephony sessions.

11. The method of claim 10, wherein the external speech server is a media resource control protocol (MRCP) compliant server.

12. The method of claim 9, wherein the enterprise archive file contains a plurality of interpreters for different markup languages, and wherein the enterprise archive file contains a servlet, said utilizing step further comprising:
for each of said SIP based telephony sessions, said servlet receiving an incoming session request;
said servlet determining at least one of said plurality of interpreters for interpreting markup during a SIP based telephony session associated with the incoming session request; and
utilizing the determined interpreter for the associated SIP based telephony session, wherein the application server internally provides IVR functionality through the IVR application without transferring communications outside the application server.

13. The method of claim 12, wherein said plurality of interpreters comprise at least one of a Voice Extensible Markup Language (VXML) based interpreter and a Call Control eXtensible Markup Language (CCXML) based interpreter.

14. The method of claim 12, wherein each of said plurality of interpreters is implemented as a different object class, and wherein each of said different object classes inherits methods from an established interpreter class.

15. The method of claim 14, wherein said methods comprise at least one method selected from a group consisting of a method to set a document to process, a method to set interpreter properties for one of said SIP based telephony sessions, a method to initialize primary interpreter processes, a method to set a listener, and a method to receive and handle events.

16. The method of claim 12, wherein a common interface is defined for each of the plurality of interpreters, wherein said servlet calls methods of the plurality of interpreters in accordance with the common interface.

17. The method of claim 9, wherein said application server is selected from at least one of a group consisting of a WEBSPHERE application server, a BEA WEBLOGIC application server, and a JBOSS application server.

18. The method of claim 9, said utilizing step further comprising:
receiving a request for a switch based telephony session from a caller;

identifying a gateway between the caller and the application server, said gateway converting signals between a switch based protocol and a SIP based protocol; and establishing communications between said caller and said IVR application across said gateway.

19. The method of claim 9, wherein the steps of claim 9 are performed by at least one of a service agent and a computing device manipulated by the service agent, the steps being performed in response to a service request.

20. The method of claim 9, wherein said steps of claim 9 are performed by at least one machine in accordance with at least one computer program having a plurality of code sections that are executable by the at least one machine.

* * * * *